Patented Jan. 31, 1939

2,145,341

UNITED STATES PATENT OFFICE 2,145,341

PROCESS FOR RECLAIMING AND DEVULCANIZING RUBBER

Charles H. Campbell, Kent, Ohio

No Drawing. Application March 18, 1938,
Serial No. 196,707

16 Claims. (Cl. 18—52)

This invention relates to an improved oil more particularly adapted for use in reclaiming rubber and to an improved process for reclaiming rubber from vulcanized rubber scrap which results in a reclaimed rubber having, among other things, improved physical and aging characteristics.

More particularly, the invention relates to an oil or combination of oils and to the use of same for softening the rubber particles in the rubber scrap and for imparting sufficient tack to the reclaimed rubber whereby it may be properly milled and sheeted or massed for further use. This application is a continuation-in-part of my application Ser. No. 78,168, filed May 6, 1936, my application Ser. No. 117,887, filed December 28, 1936, and my application Ser. No. 140,906, filed May 5, 1937.

In reclaiming plants at the present time the process probably most extensively practised requires the use of a desulphurizing agent which usually consists of from three to four percent of caustic soda, the quantity being based on the weight of ground rubber scrap, which soda is mixed in solution with the scrap and most of the free sulphur present is taken up by the caustic soda. Reclaiming oils are added, but with most of the oils now in use the rubber particles are merely softened on the outer surface, due to inability of the oil properly to penetrate the particles, resulting in a large percentage of "tailings" being left after milling.

It is, therefore, a problem in these plants, particularly when fibrous stock is being reclaimed, to cut down the percentage of "tailings" while using as little oil as possible consistent with obtaining good reclaimed stock. If it is sought to reduce the "tailings" to any great extent by increasing the amount of oil used, the finished reclaim will be too tacky for use. Hence, it is necessary to maintain the proper percentage of oil and endeavor to cut down the "tailings" by other means, such as by improving the oil used. It is also a problem to obtain a suitable oil that is sufficiently inexpensive for use in reclaiming.

I have discovered an oil or combination of oils which, due to its penetrating and softening qualities, not only requires the use of a minimum quantity to produce a good reclaim stock, but also minimizes the percentage of "tailings" remaining, and can be obtained at a very reasonable cost. This reclaiming oil consists of a combination of oils which are readily obtainable in the manufacture of gas from coal, but which ordinarily requires treatment before the best results may be obtained from its use in the reclaiming of rubber.

In the manufacture of gas, either for illuminating or heating purposes, from the distillation of coal, after the gas is freed from tar and ammonia it is cooled down to about 25° C. and is then scrubbed with an absorbent oil. The absorbent or wash oil in general use is a paraffin oil which can be obtained from any of the large oil companies and which is particularly adapted for scrubbing work because it is a "light oil" solvent. The gas is passed through a washer and flows counter-current to the absorbent or wash oil, which process removes the so-called "light oil" from the gas. Subsequently, the "light oil" is distilled from the wash oil and if, in this process, the application of heat is not too high, practically little or no wash oil is distilled over with the "light oil". This "light oil" includes benzol, toluol, the xylols and some of the heavy naphtha solvents.

In the majority of plants today the distillation of the "light oil" from the absorbent oil usually ends when a temperature of from 200° C. to 210° C. is reached and practically always before the naphthalene begins to distill, which is at a temperature about 217° C. Thus the naphthalene and the higher boiling fractions of the heavy naphthas are allowed to remain in the absorbent oil which is returned to the washer and the cycle is repeated as many times as found to be desirable. Eventually, this absorbent oil becomes so filled with naphthalene and the higher boiling fractions of the heavy naphthas that it is no longer desirable or profitable to return it to the washer, and in this condition the product is now known as the "crude still distillate". In using the latter term, both in the specification and claims, it is to be understood that I am referring to the product remaining after "light oil" recovery has been completed in the distillation of coal.

Other plants divide their "light oil" into two parts known as primary light oil and secondary light oil. The primary light oil begins to distill at a temperature about 65° C. and usually ends at a temperature about 150° C. to 160° C., while the secondary light oil begins to distill at a temperature about 160° C. and continues until a temperature about 220° C. is reached. Since naphthalene begins to distill at about 217° C., the "crude still distillate" obtainable in these plants will contain less naphthalene than in that obtainable in the first plants referred to.

In fact, the "crude still distillate" will vary with the type of coal used, the process employed in recovering the "light oil", the heat required, the time consumed in coking, and other factors, so that while the constituents of the "crude still distillate" are known, the percentage of each may vary in the different plants. An analysis of the "crude still distillate" shows that it contains substantially the following:

(1) Higher boiling fractions of the heavy naphthas.
(2) Paraffin oil and paraffin compounds.
(3) Naphthalene.
(4) Moisture.
(5) Residual products.

I use the term "higher boiling fractions of the heavy naphthas" because this term provides the best general description of the fractions of heavy naphthas which are seldom recovered due to their complexity and the higher cost of recovery and if it is understood that this term refers to those fractions of heavy naphthas which are found in the "crude still distillate" after recovery of the "light oil" has been completed, it is thought the term is definite enough for use therein. Also, it is believed that the paraffin oil and compounds, and the residual products referred to do not require a more specific analysis herein.

In tests made over a substantial period of time I have found that an oil having the constituents thereof present in the following quantities is particularly suited for use in the reclaiming of vulcanized rubber during the colder months of the year, or in plants not having sufficiently high temperature heating facilities:

|  | Per cent |
|---|---|
| Higher boiling fractions of the heavy naphthas about | 70 |
| Paraffin oil and paraffin compounds do | 17½ |
| Naphthalene do | 8 |
| Moisture do | ½ |
| Residual products do | 4 |

During the warmer months of the year or in plants not having sufficient cooling facilities it is desirable to reduce the quantity of the higher boiling fractions of the heavy naphthas in the oil and increase the quantity of paraffin oil and paraffin compounds present. The paraffin oil and paraffin compounds act as a "drying agent" and since during the warmer months most plants have an increase in tackiness of their reclaim due usually to lack of sufficient cooling medium, I prevent excessive tackiness by increasing the paraffin oil and paraffin compounds in my oil. Hence, for these warmer months I have found an oil of the following quantities particularly suited:

|  | Per cent |
|---|---|
| Higher boiling fractions of the heavy naphthas about | 60 |
| Paraffin oil and paraffin compounds do | 27½ |
| Naphthalene do | 8 |
| Moisture do | ½ |
| Residual products do | 4 |

The quantities of material in this oil may vary somewhat and still provide an excellent reclaiming oil. For example, an oil containing from about 25% to about 80% of the higher boiling fractions of the heavy naphthas, from about 5% to about 55% paraffin oils and paraffin compounds and from about 3% to about 20% naphthalene will give satisfactory results. The percentages of moisture and residual products are not ordinarily material as long as the other three constituents are present in substantially the percentages given. The item that requires the most care probably is the naphthalene and it ordinarily should not be permitted to go above 20%.

It is to be noted that the oil referred to may be fully satisfied by the "crude still distillate" obtainable from some plants, but since the percentage of the constituents of the "crude still distillate" varies with different plants, it ordinarily is necessary to add to or reduce the amount of naphthalene and/or paraffin oil and paraffin compounds, and/or higher boiling fractions of the heavy naphthas, contained in the "crude still distillate", in order to bring the latter within the ranges suitable for obtaining best results in reclaiming rubber.

The average "crude still distillate" contains approximately the following percentages of constituents:

| | |
|---|---|
| Higher boiling fractions of the heavy naphthas | From 25% to 55% |
| Paraffin oil and paraffin compounds | From 24% to 40% |
| Naphthalene | From 15% to 40% |
| Moisture | From ½% to 2% |
| Residual products | From 4% to 8% |

It will readily be seen that in order to obtain my preferred oil whether for use in cold or warm weather, the average "crude still distillate" requires treatment whereby the percentage of higher boiling fractions of the heavy naphthas is increased and the percentage of naphthalene is decreased, while the percentage of paraffin oil and paraffin compounds is also decreased. Preferably, I take the average "crude still distillate" and subject it to a chilling or freezing temperature whereby the naphthalene is caused to crystallize and can be removed in a substantially solid state. This "freezing" or chilling preferably takes place at temperatures from 20° F. to 30° F. over a period of from twenty-four to forty-eight hours, and this results in reducing the percentage of naphthalene present in the oil to about 8% and consequently results in an increase of the precentages of the remaining constituents thereof, principally the higher boiling fractions of the heavy naphthas and the paraffin oil and paraffin compounds. Any other suitable method may be utilized to reduce the naphthalene content. It will be obvious to those skilled in the art that in chilling or freezing this oil, dissipation of the heat in the oil before crystallization of the naphthalene takes place is of utmost importance and, accordingly any method of dissipating this heat satisfactorily may be utilized.

I now take the oil with the reduced naphthalene content and preferably redistill it to decrease the percentage of paraffin oil and paraffin compounds, to decrease the moisture content and to decrease the percentage of residual products therein, which decrease naturally results in an increase of the percentage of the higher boiling fractions of the heavy naphthas. While there might be a slight increase in the percentage of naphthalene during this redistillation, this increase is not ordinarily material. Should the percentage of naphthalene materially increase during the redistillation of certain types of "crude still distillate" I again subject the oil to a freezing or chilling temperature in order that the naphthalene content may be reduced to the desired percentage. To obtain my preferred oil for use during the colder months, I preferably redistill at temperatures from 200° C. to 290° C., and I find that a temperature of about 280° C. gives the best results, while to obtain the oil for use in the warmer months, I redistill at temperatures from 200° C. to 320° C., and I find that a temperature about 300° C. gives the best results.

The redistillation of the "crude still distillate" may take place prior to the "freezing" or chilling thereof as it is not extremely important which step is performed first. However, I prefer to "freeze" or chill prior to redistilling because the crystallized or solid naphtha might result in clogging or other harmful effects to portions of the still when the redistilling operation takes place.

My preferred oil for use in the colder months or in plants not having sufficiently high temperature heating facilities, shows in practice a distillation range substantially as follows:

About 6% of the oil will distill over at temperatures under 200° C.

About 70% of the oil will have distilled over at a temperature about 260° C.

About 95% of the oil will have distilled over at a temperature about 280° C.

Substantially all of the oil will have distilled over at a temperature about 315° C. with about a 4% residue remaining in the still.

My preferred oil for use in the intermediate months such as the spring and fall months shows in practice a distillation range substantially as follows:

About 4% of the oil will distill over at temperatures under 200° C.

About 60% of the oil will have distilled over at a temperature about 260° C.

About 80% of the oil will have distilled over at a temperature about 280° C.

About 95% of the oil will have distilled over at a temperature about 300° C.

Substantially all of the oil will have distilled over at a temperature about 325° C. with about a 4% residue remaining in the still.

My preferred oil for use in the warmer months or in plants not having sufficient cooling facilities shows in practice a distillation range substantially as follows:

About 4% of the oil will distill over at temperatures under 200° C.

About 55% of the oil will have distilled over at a temperature about 260° C.

About 75% of the oil will have distilled over at a temperature about 280° C.

About 94% of the oil will have distilled over at a temperature about 320° C.

Substantially all of the oil will have distilled over at a temperature about 345° C. with about a 3% to 5% residue remaining in the still.

In using the preferred oil in reclaiming rubber from fibrous stock I preferably introduce the oil into the digestor with the rubber scrap, and with a suitable desulphurizing agent, using heat, moisture and pressure in the customary manner, whereby the oil will thoroughly penetrate the rubber and properly soften it with as little tack as possible. In practice I have found that in reclaiming passenger car tires and other rubber articles having substantially the same compound as such tires only about 2½% to 3% of oil, determined as against the weight of the rubber scrap used, is necessary to obtain the best results, and produces an excellent reclaim stock, while keeping the percentage of "tailings" to about 2% to 6%, depending upon the age and condition of the rubber being reclaimed. In reclaiming giant tires such as bus and truck tires it is necessary to use about 3% to 3½% of oil, determined as aforesaid, to obtain the best results, and even with this increase in the percentage of oil used, the percentage of "tailings" is only around 12%. A mixture of passenger car tires and giant tires in the ratio of about three parts by weight of the former to one part by weight of the latter requires only about 3% to 3½% of the oil, determined as aforesaid, and the percentage of "tailings" is only about 8% to 10%. To one familiar with this art it will be instantly found that the percentage of "tailings" resulting from the use of my oil is reduced substantially and the grain or fineness of the finished reclaim is comparable to the best quality reclaim stock now produced, yet the cost of my oil is substantially less than that of other oils, with which I am familiar, that could really be termed reclaim oils. It is also possible to vary the percentage of my oil used in the digestor by varying the pressure utilized in the latter during the digesting process. Also, it is possible to increase the percentages of oil as herein specified when the oil is used in some reclaiming plants in order to compensate for any loss of oil that may take place due to the high temperatures and pressures used in these plants.

Probably some, if not all, of the "crude still distillates" not meeting the requirements of the preferred oil could be used to soften the rubber in the digestor during devulcanization with a measure of success, but the percentages herein given attain the best results without the tack that follows the use of excess percentages of naphthalene, and the higher boiling fractions of the heavy naphthas, or of either. From 8% to 10% of naphthalene has given the best results with none of the ill effects ordinarily attributed to the use of naphthalene, such as injuries to workmen from naphthalene fumes. Likewise, the percentages given of paraffin oil and compounds do their portion of the work without resulting in blooming of the rubber after treatment. Also, the higher boiling fractions of the heavy naphthas assist in softening the rubber without too much tack.

In some plants there is in use a so-called "pan process" for reclaiming rubber from non-fibrous stock, such as inner tubes and tire treads, and the method of treating the stock varies somewhat from that used in treating fibrous stock. In this process the rubber usually is treated in pans without the benefit of the mixing and stirring obtained in a digestor, and with some types of non-fibrous stock it may be possible to use little or no caustic soda or similar agent. In the treatment of these non-fibrous stocks with my oil it sometimes becomes necessary to increase the percentage of naphthalene therein to as much as 17% to 20% in order to obtain the best reclaim. Also, the amount of oil, determined as against the weight of the rubber scrap used, may be increased. For example, in reclaiming substantially new tube stock the use of as much as 20% of the oil, determined as aforesaid, has been found desirable. Likewise, as much as 10% to 12% of oil has been found desirable in reclaiming old tube stock, and as much as 15% of oil has been found desirable in reclaiming tire tread stock.

The formula for my oil when used in the "pan process" can be varied considerably from the preferred formulas used in connection with a digestor. In the former it is readily possible to use as little as 25% of the higher boiling fractions of the heavy naphthas, and this oil may contain as much as 55% paraffin oil and paraffin compounds, but the naphthalene ordinarily should not be permitted to go above 20%. In fact the quantities of material in my oil for use in the "pan process" may be varied within the limits specified for the oil to be used in a digestor.

My oil appears to be particularly beneficial when used in reclaiming rubber because it softens the rubber relatively better than other oils and does not require the rubber to swell as much as other oils, in order to permit the oil properly to penetrate the rubber. When heat is applied to the scrap after it has been treated with my oil, the rubber particles soften sufficiently without effecting solution of the rubber. Furthermore, the finished reclaim is practically odorless, insofar as any odor from the oil is concerned. By passing this oil through a colloid mill before introducing it into the digestor it is possible to reduce the percentage of oil required from 15% to 20%, and this is true whether or not a stabilizing agent is used in the mill, although it is preferred to use a stabilizing agent such as bentonite.

It is also possible to reduce the percentage of oil needed by breaking the oil up into fine particles or globules by any suitable means, so that a thorough coating of the ground rubber scrap with particles of oil will be assured.

It might be well to call attention to the fact that in the devulcanization of rubber the practices of various reclaiming plants have changed materially in the last few years. In small plants the old method of reclaiming in the digestor, producing a very soft, fine-grained, tacky reclaim is permissible, but in the large plants which are highly mechanized, speed is an absolute necessity and the reclaim stock obtained must not only be soft, but have little tack, because the high speed mills, calenders and spreaders through which the reclaim stock must pass become heated in use and too much tack in the reclaim causes the rubber to stick and slow down the operations of these machines. My reclaim oil shows excellent results when used in these highly mechanized plants. However, if for any reason, it is desirable to use a greater percentage of my oil which would ordinarily increase the tack, it is still possible to prevent too much tack by adding a reasonable quantity of any suitable drying oil to my preferred oil.

However, there are occasions when it is desirable to increase the tack of the finished reclaim without rendering it so tacky as to be unfit for use, and I have discovered that this increase in tack may be obtained by adding to my base oil which is otherwise ready for use in reclaiming rubber, a percentage to fit the case of gum, resin or even a heavy creosote oil or a tar oil, any or all of which will produce the desired result. In the case of gums or resins, I usually add from 4% to 8% by weight, while in the case of a heavy creosote oil or tar oil, or any other tacky oil, I add from 10% to 20% by volume.

It may also be desirable in reclaiming certain stocks such as tube stocks, etc., to increase the solvency of my oil by adding to any of the formulas for my base oil, a highly solvent oil, such as solvent naphtha or any cut thereof, or any other suitable solvent oil the reclaimer might desire to use. It usually is necessary to add from 10% to 20% by volume of such solvent oil to produce the desired result.

With my preferred oil and with the foregoing additions thereto I am enabled to meet practically any specific requirements which may arise, even though such requirements usually are small.

In discovering that I could use the "crude still distillate" as a reclaiming oil, I have not only benefited the reclaim industry by providing an oil or combination of oils which produces a better reclaim stock with a minimum percentage of requirements, and with a minimum percentage of "tailings" remaining, but I have found a new outlet for the "crude still distillate".

It might, of course, be possible synthetically to build up my compound without utilizing the "crude still distillate" at all, but the cost of such procedure would be prohibitive.

While I have described the preferred form of my oil and the preferred process for utilizing same in the reclaiming of rubber, it is to be understood that the invention is not so limited but that various modifications thereof may be resorted to without departing from the spirit thereof and the scope of the subjoined claims.

What is claimed is:

1. The step in the process of devulcanizing rubber which comprises adding to vulcanized rubber scrap an oil including between 25% to 80% of the higher boiling fractions of the heavy naphthas, between 5% to 55% of paraffin oil and paraffin compounds, and naphthalene, to soften the rubber, the naphthalene content being not more than 20%.

2. The step in the process of devulcanizing rubber which comprises adding to vulcanized rubber scrap an oil including between 25% to 80% of the higher boiling fractions of the heavy naphthas, between 5% to 55% of paraffin oil and paraffin compounds, and between 3% to 20% naphthalene, to soften the rubber.

3. The step in the process of devulcanizing rubber which comprises adding to vulcanized rubber scrap an oil comprising substantially 70% of the higher boiling fractions of the heavy naphthas, about 17½% paraffin oil and paraffin compounds, and about 8% naphthalene, to soften the rubber.

4. The step in the process of devulcanizing rubber which comprises adding to vulcanized rubber scrap an oil comprising substantially 60% of the higher boiling fractions of the heavy naphthas, about 27½% paraffin oil and paraffin compounds, and about 8% naphthalene, to soften the rubber.

5. The process of devulcanizing rubber scrap which comprises introducing an oil comprising between 25% to 80% of the higher boiling fractions of the heavy naphthas, between 5% to 55% of paraffin oil and paraffin compounds, naphthalene, moisture and residual products into a reclaiming unit with the scrap in the presence of heat and pressure, the naphthalene content of the oil being not more than 20%.

6. The process of devulcanizing rubber scrap which comprises introducing an oil comprising between 25% to 80% of the higher boiling fractions of the heavy naphthas, between 5% to 55% paraffin oil and paraffin compounds, between 3% to 20% naphthalene, about ½% moisture and about 4% residual products into a reclaiming unit with the scrap in the presence of heat and pressure.

7. The process of devulcanizing rubber scrap which comprises introducing an oil comprising substantially 70% of the higher boiling fractions of the heavy naphthas, about 17½% paraffin oil and paraffin compounds, about 8% naphthalene, about ½% moisture and about 4% residual products into a reclaiming unit with the scrap in the presence of heat and pressure.

8. The process of devulcanizing rubber scrap which comprises introducing an oil comprising substantially 60% of the higher boiling fractions of the heavy naphthas, about 27½% paraffin oil and paraffin compounds, about 8% naphthalene, about ½% moisture and about 4½ residual products into a reclaiming unit with the scrap in the presence of heat and pressure.

9. The step in the process of devulcanizing vulcanized rubber scrap which consists in treating the scrap with an oil comprising substantially 70% of the higher boiling fractions of the heavy naphthas, about 17½% paraffin oil and paraffin compounds and about 8% napthalene, and applying heat to the treated scrap so as to cause the ground rubber particles to soften without effecting solution of the rubber.

10. The step in the process of devulcanizing vulcanized rubber scrap which consists in treating the scrap with an oil comprising substantially 60% of the higher boiling fractions of the heavy naphthas, about 27½% paraffin oil and paraffin compounds, and about 8% naphthalene, and applying heat to the treated scrap so as to cause the ground rubber particles to soften without effecting solution of the rubber.

11. The process of devulcanizing rubber scrap which comprises introducing an oil containing between 25% to 80% of the higher boiling fractions of the heavy naphthas, between 5% to 55% of paraffin oil and paraffin compounds, and naphthalene, the naphthalene content being not more than 20%, into a reclaiming unit with the scrap and with a drying oil in the presence of heat and pressure.

12. The process of devulcanizing rubber scrap which comprises introducing an oil containing between 25% to 80% of the higher boiling fractions of the heavy naphthas, between 5% to 55% of paraffin oil and paraffin compounds, and naphthalene, the naphthalene content being not more than 20%, together with a substance for increasing the tack in the finished reclaim, into a reclaiming unit in the presence of heat and pressure.

13. The process of devulcanizing rubber scrap which comprises introducing an oil containing between 25% to 80% of the higher boiling fractions of the heavy naphthas, between 5% to 55% of paraffin oil and paraffin compounds, and naphthalene, the naphthalene content being not more than 20%, together with a substance for increasing the tack in the finished reclaim selected from the group consisting of a gum, a resin, a heavy creosote oil and a tar oil, into a reclaiming unit in the presence of heat and pressure.

14. The process of devulcanizing rubber scrap which comprises introducing an oil containing between 25% to 80% of the higher boiling fractions of the heavy naphthas, between 5% to 55% of paraffin oil and paraffin compounds, and naphthalene, the naphthalene content being not more than 20%, and a high solvent oil, into a reclaiming unit in the presence of heat and pressure.

15. The process of devulcanizing rubber scrap which comprises introducing an oil containing between 25% to 80% of the higher boiling fractions of the heavy naphthas, between 5% to 55% of paraffin oil and paraffin compounds, and naphthalene, the naphthalene content being not more than 20%, together with from 4% to 8% by weight of a substance for increasing the tack in the finished reclaim, into a reclaiming unit in the presence of heat and pressure.

16. The process of devulcanizing rubber scrap which comprises introducing an oil containing between 25% to 80% of the higher boiling fractions of the heavy naphthas, between 5% to 55% of paraffin oil and paraffin compounds, and naphthalene, the naphthalene content being not more than 20%, and from 10% to 20% by volume of a high solvent oil, into a reclaiming unit in the presence of heat and pressure.

CHARLES H. CAMPBELL.

---

CERTIFICATE OF CORRECTION.

Patent No. 2,145,341.            January 31, 1939.

CHARLES H. CAMPBELL.

It is hereby certified that error appears in the printed specification of the above numbered patent requiring correction as follows: Page 2, first column, line 16, for the word "higher" read high; page 5, first column, line 4, claim 8, for "4½" read 4%; and that the said Letters Patent should be read with this correction therein that the same may conform to the record of the case in the Patent Office.

Signed and sealed this 21st day of March, A. D. 1939.

Henry Van Arsdale.

(Seal)                    Acting Commissioner of Patents.

substantially 60% of the higher boiling fractions of the heavy naphthas, about 27½% paraffin oil and paraffin compounds, about 8% naphthalene, about ½% moisture and about 4½ residual products into a reclaiming unit with the scrap in the presence of heat and pressure.

9. The step in the process of devulcanizing vulcanized rubber scrap which consists in treating the scrap with an oil comprising substantially 70% of the higher boiling fractions of the heavy naphthas, about 17½% paraffin oil and paraffin compounds and about 8% napthalene, and applying heat to the treated scrap so as to cause the ground rubber particles to soften without effecting solution of the rubber.

10. The step in the process of devulcanizing vulcanized rubber scrap which consists in treating the scrap with an oil comprising substantially 60% of the higher boiling fractions of the heavy naphthas, about 27½% paraffin oil and paraffin compounds, and about 8% naphthalene, and applying heat to the treated scrap so as to cause the ground rubber particles to soften without effecting solution of the rubber.

11. The process of devulcanizing rubber scrap which comprises introducing an oil containing between 25% to 80% of the higher boiling fractions of the heavy naphthas, between 5% to 55% of paraffin oil and paraffin compounds, and naphthalene, the naphthalene content being not more than 20%, into a reclaiming unit with the scrap and with a drying oil in the presence of heat and pressure.

12. The process of devulcanizing rubber scrap which comprises introducing an oil containing between 25% to 80% of the higher boiling fractions of the heavy naphthas, between 5% to 55% of paraffin oil and paraffin compounds, and naphthalene, the naphthalene content being not more than 20%, together with a substance for increasing the tack in the finished reclaim, into a reclaiming unit in the presence of heat and pressure.

13. The process of devulcanizing rubber scrap which comprises introducing an oil containing between 25% to 80% of the higher boiling fractions of the heavy naphthas, between 5% to 55% of paraffin oil and paraffin compounds, and naphthalene, the naphthalene content being not more than 20%, together with a substance for increasing the tack in the finished reclaim selected from the group consisting of a gum, a resin, a heavy creosote oil and a tar oil, into a reclaiming unit in the presence of heat and pressure.

14. The process of devulcanizing rubber scrap which comprises introducing an oil containing between 25% to 80% of the higher boiling fractions of the heavy naphthas, between 5% to 55% of paraffin oil and paraffin compounds, and naphthalene, the naphthalene content being not more than 20%, and a high solvent oil, into a reclaiming unit in the presence of heat and pressure.

15. The process of devulcanizing rubber scrap which comprises introducing an oil containing between 25% to 80% of the higher boiling fractions of the heavy naphthas, between 5% to 55% of paraffin oil and paraffin compounds, and naphthalene, the naphthalene content being not more than 20%, together with from 4% to 8% by weight of a substance for increasing the tack in the finished reclaim, into a reclaiming unit in the presence of heat and pressure.

16. The process of devulcanizing rubber scrap which comprises introducing an oil containing between 25% to 80% of the higher boiling fractions of the heavy naphthas, between 5% to 55% of paraffin oil and paraffin compounds, and naphthalene, the naphthalene content being not more than 20%, and from 10% to 20% by volume of a high solvent oil, into a reclaiming unit in the presence of heat and pressure.

CHARLES H. CAMPBELL.

---

CERTIFICATE OF CORRECTION.

Patent No. 2,145,341.     January 31, 1939.

CHARLES H. CAMPBELL.

It is hereby certified that error appears in the printed specification of the above numbered patent requiring correction as follows: Page 2, first column, line 16, for the word "higher" read high; page 5, first column, line 4, claim 8, for "4½" read 4%; and that the said Letters Patent should be read with this correction therein that the same may conform to the record of the case in the Patent Office.

Signed and sealed this 21st day of March, A. D. 1939.

Henry Van Arsdale.

(Seal)            Acting Commissioner of Patents.